United States Patent
Lee et al.

(10) Patent No.: US 12,306,774 B2
(45) Date of Patent: May 20, 2025

(54) COMPUTATIONAL STORAGE DEVICE AND METHOD OF OPERATING THE SAME

(71) Applicant: Samsung Electronics Co., Ltd., Suwon-si (KR)

(72) Inventors: Jong Won Lee, Suwon-si (KR); Sang Oak Woo, Suwon-si (KR); Myung June Jung, Suwon-si (KR); Jae Ho Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/206,264

(22) Filed: Jun. 6, 2023

(65) Prior Publication Data

US 2024/0193105 A1    Jun. 13, 2024

(30) Foreign Application Priority Data

Dec. 7, 2022    (KR) ........................ 10-2022-0169723

(51) Int. Cl.
*G06F 13/16*    (2006.01)
(52) U.S. Cl.
CPC ...... *G06F 13/1668* (2013.01); *G06F 13/1621* (2013.01)
(58) Field of Classification Search
None
See application file for complete search history.

(56) References Cited

U.S. PATENT DOCUMENTS

| 9,864,636 | B1 | 1/2018 | Patel et al. |
| 9,990,139 | B2 | 6/2018 | Nadakuditi et al. |
| 10,146,936 | B1 * | 12/2018 | Khanduja ........... G06F 9/45558 |
| 10,275,361 | B2 | 4/2019 | Ish et al. |

(Continued)

FOREIGN PATENT DOCUMENTS

| CN | 114691037 | * | 7/2022 |
| CN | 114691037 | A | 7/2022 |

(Continued)

OTHER PUBLICATIONS

Communication issued Mar. 19, 2024 by the European Patent Office in European Patent Application No. 23201314.4.

(Continued)

*Primary Examiner* — Yaima Rigol
(74) *Attorney, Agent, or Firm* — Sughrue Mion, PLLC

(57) ABSTRACT

An operating method of a computational storage device includes: setting a first computing namespace, including a first queue and a first accelerator and having a first value as its first ID, per instructions from a first host; setting a second computing namespace, including a second queue and a second accelerator and having a second value as its first ID, per instructions from a second host; loading a first program from the first host in the first computing namespace; loading a second program from the second host in the second computing namespace; setting a second ID of the first computing namespace to a third value based on an ID of the first program per instructions to activate the first program; and setting the second ID of the second computing namespace to a fourth value based on an ID of the second program per instructions to activate the second program.

20 Claims, 17 Drawing Sheets

(56) References Cited

U.S. PATENT DOCUMENTS

| | | |
|---|---|---|
| 10,558,376 B2 | 2/2020 | Hahn et al. |
| 10,592,280 B2 | 3/2020 | Ballantyne et al. |
| 10,838,852 B2 | 11/2020 | Pinto |
| 10,877,796 B1 | 12/2020 | Kinney, Jr. et al. |
| 2012/0079184 A1* | 3/2012 | Jaquette ............ G06F 3/0685 711/111 |
| 2015/0317088 A1 | 11/2015 | Hussain et al. |
| 2021/0073086 A1* | 3/2021 | Bannur Subraya ..................... G06F 11/3476 |
| 2022/0365709 A1* | 11/2022 | Raghunath ............ G06F 3/0679 |

FOREIGN PATENT DOCUMENTS

| | | |
|---|---|---|
| EP | 4 064 086 A1 | 9/2022 |
| WO | 2018/201249 A1 | 11/2018 |

OTHER PUBLICATIONS

Communication issued Apr. 2, 2024 by the European Patent Office in European Patent Application No. 23201314.4.

\* cited by examiner

FIG. 7

| CNS | Q ID | G ID | PUID/UPI |
|-----|------|------|----------|
| 1   | 1    |      |          |
|     |      |      |          |

FIG. 9

| CNS | Q ID | G ID | PUID/UPI |
|-----|------|------|----------|
| 1   | 1    |      |          |
| 2   | 2    |      |          |
|     |      |      |          |

| CNS | Q ID | G ID | PUID/UPI |
|---|---|---|---|
| 1 | 1 | | |
| 2 | 2 | | |
| 3 | 1 | | |

| CNS | Q ID | G ID | PUID/UPI |
|---|---|---|---|
| 1 | 1 | 1 | a |
| 2 | 2 | | |
| 3 | 1 | 1 | a |

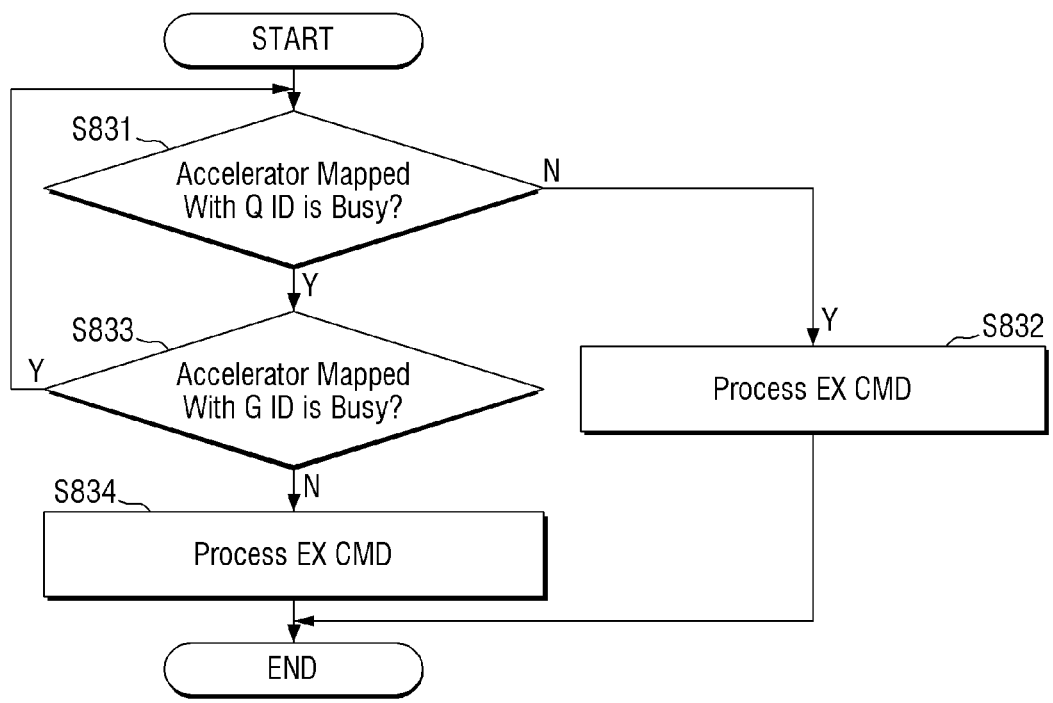

COMPUTATIONAL STORAGE DEVICE AND METHOD OF OPERATING THE SAME

CROSS-REFERENCE TO RELATED APPLICATION

This application claims priority from Korean Patent Application No. 10-2022-0169723 filed on Dec. 7, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a computational storage device and a method of operating the same.

2. Description of Related Art

Semiconductor memory devices include volatile memory devices and nonvolatile memory devices. The read and write speeds of the volatile memory device are fast. Meanwhile, however, the volatile memory device may lose stored content when powered off. In contrast, the nonvolatile memory devices are able to maintain stored content even when powered off, and thus, the nonvolatile memory devices are used to store content that needs to be retained regardless of whether the semiconductor memory devices are powered on or off.

The volatile memory devices include a static random-access memory (SRAM), a dynamic random-access memory (DRAM), and a synchronous DRAM (SDRAM). The nonvolatile memory devices may include a read-only memory (ROM), a programmable ROM (PROM), an electrically programmable ROM (EPROM), an electrically erasable and programmable ROM (EEPROM), a flash memory, a phase-change random-access memory (PRAM), a magnetic random-access memory (MRAM), a resistive random-access memory (RRAM), and a ferroelectric random-access memory (FRAM). The flash memory may be classified into a NOR flash memory and a NAND flash memory.

Recently, attempts have been made in various fields to improve the processing speed of an electronic device by combining a processor and an accelerator, and studies are being conducted on mass storage devices such as a solid state drives (SSD), particularly, a computational storage device based on an accelerator-based platform.

SUMMARY

Embodiments of the disclosure provide a computational storage device with an improved performance and a method of operating the same.

The disclosure is not restricted to the embodiments set forth herein. Various other aspects of the disclosure will become apparent to one of ordinary skill in the art to which the disclosure pertains by referencing the detailed description of the disclosure given below.

According to an embodiment, there is provided a method of operating a computational storage device, which may include: setting, by a storage controller, a first computing namespace, which includes a first queue and a first accelerator, and has a first value as a first identifier (ID) of the first computing namespace, in response to an instruction to set the first computing namespace received from a first host device; setting, by the storage controller, a second computing namespace, which includes a second queue and a second accelerator, and has a second value as its first ID, in response to an instruction to set the second computing namespace received from a second host device, the second value being the same as or different from the first value; receiving, by the storage controller, a first program from the first host device and loading the first program in the first computing namespace; receiving, by the storage controller, a second program from the second host device and loading the second program in the second computing namespace; setting, by the storage controller, a second ID of the first computing namespace to a third value based on an ID of the first program in response to instruction to activate the first program received from the first host device; and setting, by the storage controller, the second ID of the second computing namespace to a fourth value based on an ID of the second program in response to instruction to activate the second program received from the second host device, the fourth value being the same as or different from the third value.

According to an embodiment, there is provided a method of operating a computational storage device, which may include: receiving, by a storage controller, from a host device, an execute command giving an instruction to process a computation using a first computing namespace, which includes a first queue and a first accelerator, and a first program; storing, by the storage controller, the execute command in the first queue; selecting, by the storage controller, the first accelerator in response to the first accelerator not being busy; identifying, by the storage controller, a second accelerator of which a first identifier (ID) is mapped to a same value as the first ID of the first accelerator, from among a plurality of accelerators, in response to the first accelerator being busy; selecting, by the storage controller, the second accelerator in response to the second accelerator not being busy; selecting a third accelerator of which a second ID different from the first ID is mapped to the same value as the second ID of the first accelerator, from among the plurality of accelerators, in response to the second accelerator being busy; and computing, by whichever of the first accelerator, the second accelerator, and the third accelerator is selected, data in accordance with the execute command, using the first program.

According to an embodiment, there is provided a computational storage device, which may include: a nonvolatile memory storing data; a storage controller configured to control the nonvolatile memory; and a plurality of accelerators configured to compute the data in accordance with an execute command received from a host device, using a program received from the host device, wherein the storage controller is configured to: map first identifiers (IDs) to the plurality of accelerators in response to an instruction to set a computing namespace received from the host device; map second IDs to the plurality of accelerators in response to an instruction to activate a program received from the host device; receive, from the host device, a first execute command to be processed using a first accelerator of which the first ID is set to a first value; and select at least one of the plurality of accelerators to process a computation in accordance with the first execute command, based on the first IDs and the second IDs.

It should be noted that the effects are not limited to those described above, and other effects will be apparent from the following description.

BRIEF DESCRIPTION OF DRAWINGS

The above and other aspects and features will become more apparent by describing in detail exemplary embodiments thereof with reference to the attached drawings, in which:

FIGS. 6 through 20 illustrate the operation of the memory system of FIG. 5, according to embodiments.

DETAILED DESCRIPTION

Embodiments will be described with reference to the attached drawings.

Figure 1:
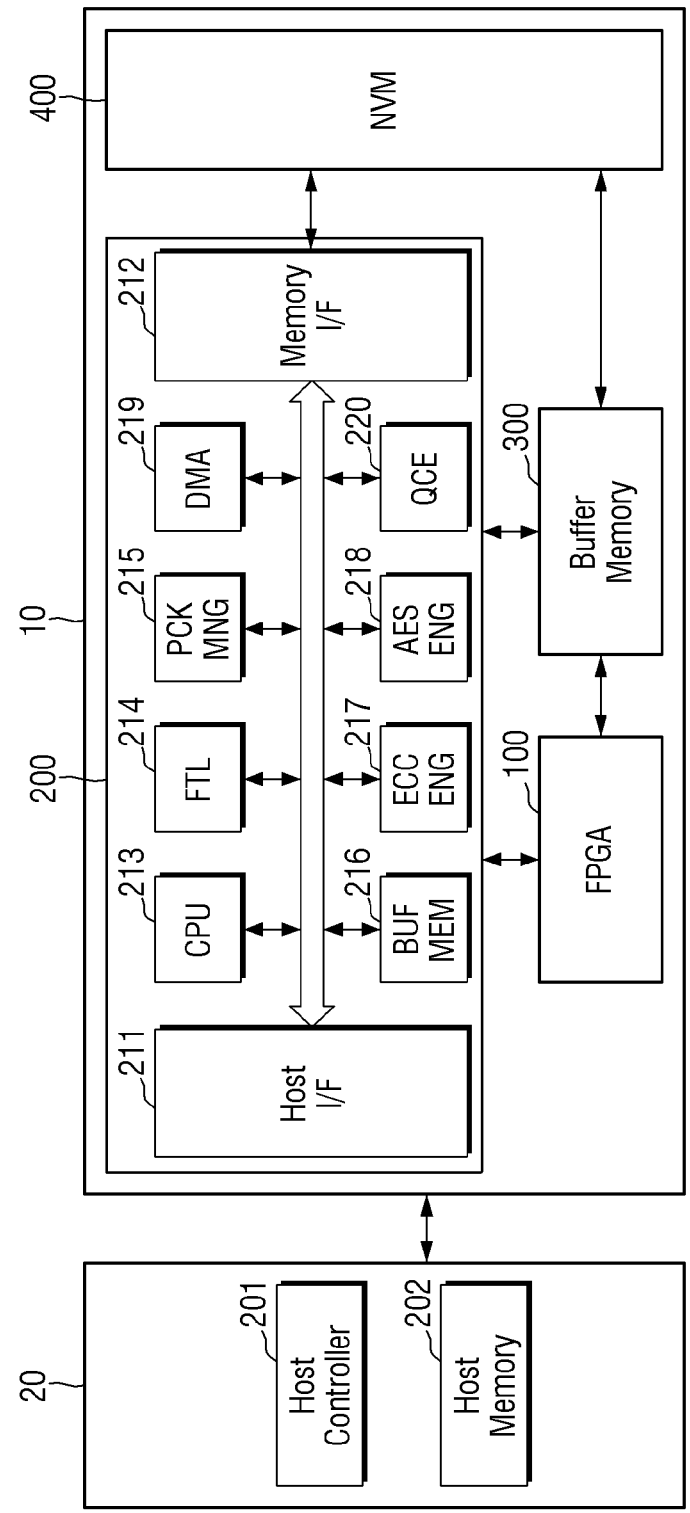
FIG. 1 is a block diagram of a memory system, according to an embodiment.

FIG. 1 is a block diagram of a memory system, according to an embodiment.

Referring to FIG. 1, a memory system 1 may include a host device 20 and a storage device 10.

The host device 20 may include a host controller 201 and a host memory 202. The host controller 201 may control the general operation of the host device 20. In an embodiment, the host controller 201 may include a plurality of entities or tenants, which run as a plurality of virtual machines (VMs). The entities or tenants may independently control the storage device 10.

The host memory 202 may temporarily store data received from the outside, data to be transmitted to the storage device 10, or data received from the storage device 10. In an embodiment, the host device 20 may be implemented as an application processor (AP), but the disclosure is not limited thereto.

The storage device 10 may be, for example, a computational storage device.

The storage device 10 may include a field-programmable gate array (FPGA) 100, a storage controller 200, a buffer memory 300, and a nonvolatile memory 400.

The storage device 10 may include a storage medium for storing data upon request from the host device 20. For example, the storage device 10 may include at least one of a solid state driver (SSD), an embedded memory, and an external memory. In a case where the storage device 10 is an SSD, the storage device 10 may conform to the Non-Volatile Memory express (NVMe) standard. In a case where the storage device 10 is an embedded memory or an external memory, the storage device 10 may conform to the Universal Flash Storage (UFS) or embedded Multi-Media Card (eMMC) standard. The storage device 10 and the host device 20 may generate and transmit packets in accordance with their respective standard protocol.

In a case where the nonvolatile memory 400 of the storage device 10 includes a flash memory, the flash memory may be implemented by a two-dimensional (2D) NAND memory array and/or a three-dimensional (3D) NAND (or a vertical NAND (VNAND)) memory array. Alternatively, the storage device 10 may include various other types of nonvolatile memory. For example, a magnetic random-access memory (MRAM), a spin-transfer torque MRAM, a conductive bridging random-access memory (CBRAM), a ferroelectric random-access memory (FeRAM), a phase-change random-access memory (PRAM), a resistive random-access memory (RRAM), etc. may implement the storage device 10.

The FPGA 100 may perform various computations or calculations on data stored in the buffer memory 300. In an embodiment, the FPGA 100 may include a plurality of accelerators performing various computations or calculations on the data stored in the buffer memory 300, based on execute commands from the host device 20.

The FPGA 100 may perform computations using data temporarily stored in the buffer memory 300 and an algorithm mapped to a hardware logic configuration. In an embodiment, the FPGA 100 may perform a computation using the data stored in the nonvolatile memory 400, without the intervention of the host device 20.

The storage controller 200 may include a host interface 211, a memory interface 212, and a central processing unit (CPU) 213. The storage controller 200 may further include a flash translation layer (FTL) 214, a packet manager 215, a buffer memory 216, an error correction code (ECC) engine 217, an advanced encryption standard (AES) engine 218, a direct memory access (DMA) engine 219, and a queue control engine 220. At least one of these components of the storage controller may physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by firmware and/or software (configured to perform the functions or operations described herein).

The storage controller 200 may further include a working memory into which the FTL 214 is loaded, and the writing/reading of data to/from the nonvolatile memory 400 may be controlled by the CPU 213 through the execution of the FTL 214.

The host interface 211 may exchange packets with the host device 20. Packets transmitted from the hots device 20 to the host interface 211 may include commands or data to be written to the nonvolatile memory 400, and packets transmitted from the hots interface 211 to the hots device 20 may include responses to commands or data read out from the nonvolatile memory 400.

The memory interface 212 may transmit data to be written to the nonvolatile memory 400 or may receive data read out from the nonvolatile memory 400. The memory interface 212 may be configured to conform to the Toggle or Open NAND Flash Interface (ONFI) standard.

The FTL 214 may perform various functions such as address mapping, wear-leveling, and garbage collection. Address mapping is an operation of converting a logical address received from the host device 20 into a physical address for actually storing data in the nonvolatile memory 400. Wear-leveling is a technique of allowing blocks in the nonvolatile memory 400 to be uniformly used to prevent excessive deterioration of particular blocks and may be implemented as, for example, firmware for balancing the erase counts of physical blocks. Garbage collection is a technique of securing available storage capacity in the nonvolatile memory 400 by copying valid data to new blocks and erasing existing blocks.

The packet manager 215 may generate packets, or parse various information from packets received from the host device 20, in accordance with the protocol of an interface negotiated with the host device 20.

The buffer memory 216 may temporarily store data to be written to the nonvolatile memory 400 or data to be read from the nonvolatile memory 400. The buffer memory 216 may be included in the storage controller 200 or may be disposed outside the storage controller 200.

The ECC engine 217 may perform error detection and correction functions on data read out from the nonvolatile memory 400. Specifically, the ECC engine 217 may generate parity bits for data to be written to the nonvolatile memory 400, and the parity bits may be stored in the nonvolatile memory 400 together with the data to be written to the nonvolatile memory 400. In the case of reading out data from the nonvolatile memory 400, the ECC engine 217 may correct error in the read-out data using parity bits read out from the nonvolatile memory 400 together with the read-out data, and may output the error-corrected data.

The AES engine 218 may perform at least one of an encryption operation and a decryption operation on data input to the storage controller 200, using a symmetric key algorithm.

The DMA engine 219 may read or fetch data blocks from the buffer memory 300 such that the accelerators of the FPGA 100 may perform computations. The DMA engine 219 is illustrated as being included in the storage controller 200, but the disclosure is not limited thereto. Alternatively, the DMA engine 219 may be implemented inside the FPGA 100 or outside storage controller 200.

The queue control engine 220 may select one of the accelerators included in the storage device 10, for example, in the FPGA 100, and may control the selected accelerator to process a computation in accordance with an execute command from the host device 20. To this end, the queue control engine 220 may manage the queue identifiers (IDs) (e.g., Q ID of FIG. 16) and group IDs (e.g., G ID of FIG. 16) of different computing namespaces (e.g., CNS of FIG. 16). The operation of the queue control engine 220 will be described later.

The queue control engine 220 is illustrated as being included in the storage controller 200, but the disclosure is not limited thereto. Alternatively, the queue control engine 220 may be implemented inside the FPGA 100 or outside the storage controller 200.

The buffer memory 300 may buffer the data stored in the nonvolatile memory 400. Also, the buffer memory 300 may buffer data received from the FPGA 100 (e.g., data computed by the accelerators of the FPGA 100). That is, the buffer memory 300 may temporarily store the data stored in the nonvolatile memory 400 such that the FPGA 100 may use the corresponding data. The nonvolatile memory 400 may store necessary data for an operation of the FPGA 100.

Figure 2:
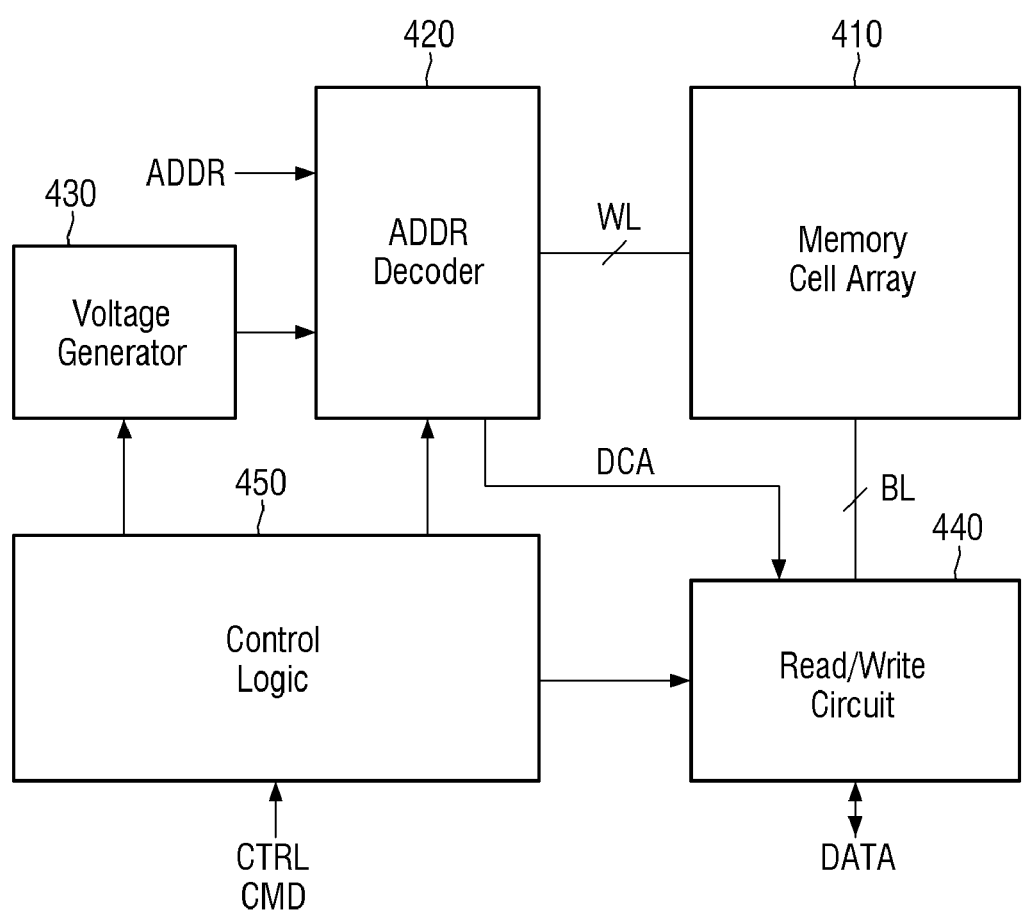
FIG. 2 is a block diagram illustrating a nonvolatile memory of FIG. 1, according to an embodiment.

FIG. 2 is a block diagram illustrating the nonvolatile memory of FIG. 1, according to an embodiment.

Referring to FIG. 2, the nonvolatile memory 400 may include a memory cell array 410, an address decoder 420, a voltage generator 430, a read/write circuit 440, and a control logic 450.

The memory cell array 410 may be connected to the address decoder 420 via word lines WL. The memory cell array 410 may be connected to the read/write circuit 440 via bit lines BL. The memory cell array 410 may include a plurality of memory cells. For example, memory cells arranged in a row direction or a same row may be connected to the same word line WL, and memory cells arranged in a column direction or a same column may be connected to the same bit line BL.

The address decoder 420 may be connected to the memory cell array 410 via the word lines WL. The address decoder 420 may operate under the control of the control logic circuit 450. The address decoder 420 may receive addresses ADDR from the storage controller 200. The address decoder 420 may receive voltages necessary for, for example, program and read operations, from the voltage generator 430.

The address decoder 420 may decode a row address from among the addresses ADDR. The address decoder 420 may select one of the word lines WL using the decoded row address. A decoded column address DCA may be provided to the read/write circuit 440. For example, the address decoder 420 may include a row decoder, a column decoder, and an address buffer.

The voltage generator 430 may generate voltages necessary for an access operation under the control of the control logic circuit 450. For example, the voltage generator 430 may generate a program voltage and a program-verify voltage for performing a program operation. For example, the voltage generator 430 may generate read voltages for performing a read operation and an erase voltage and an erase-verify voltage for performing an erase operation. Also, the voltage generator 430 may provide voltages necessary for performing each operation to the address decoder 420.

The read/write circuit 440 may be connected to the memory cell array 410 via the bit lines BL. The read/write circuit 440 may exchange data with the storage controller 200. The read/write circuit 440 may operate under the control of the control logic circuit 450. The read/write circuit 440 may receive the decoded column address DCA from the address decoder 420. The read/write circuit 440 may select one of the bit lines BL using the decoded column address DCA.

For example, the read/write circuit 440 may program data to the memory cell array 410. The read/write circuit 440 may read out data from the memory cell array 410, and may provide the read-out data to the outside (e.g., the storage controller 200). For example, the read/write circuit 440 may include a sense amplifier, a write driver, a column selection circuit, and a page buffer. That is, the read/write circuit 440 may buffer the data into a page buffer, and may program the buffered data to the memory cell array 410.

The control logic circuit 450 may be connected to the address decoder 420, the voltage generator 430, and the read/write circuit 440. The control logic circuit 450 may control the operation of the nonvolatile memory 400. The control logic circuit 450 may operate in response to a control signal CTRL and a command CMD (e.g., a write command or a read command) from the storage controller 200.

Figure 3:
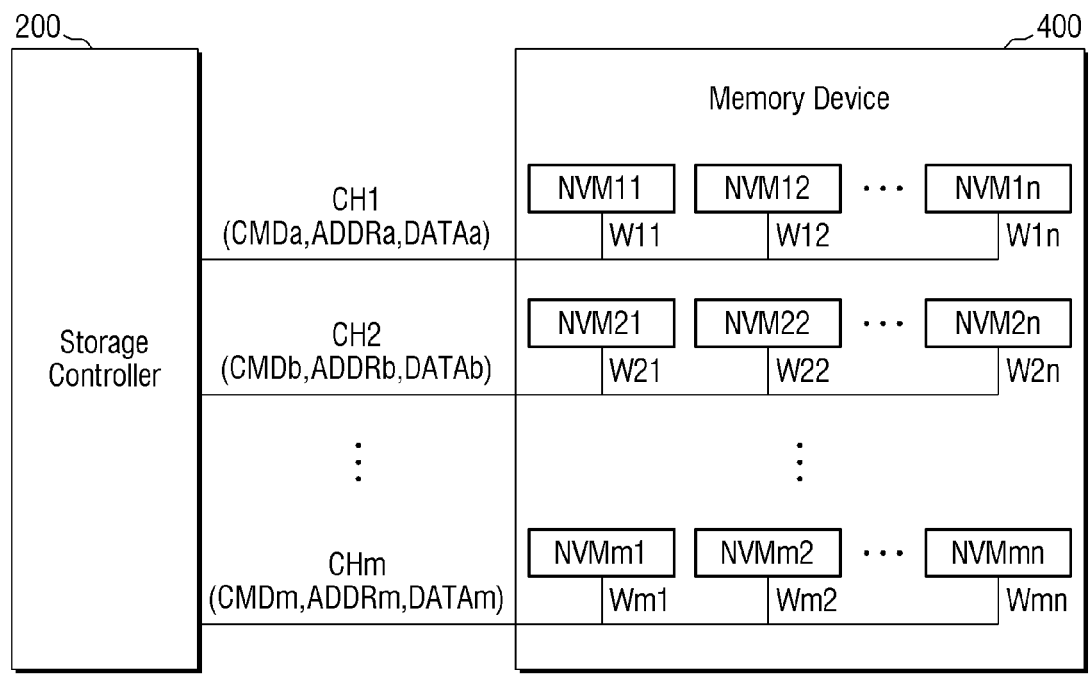
FIG. 3 is a block diagram illustrating a storage controller and the nonvolatile memory of FIG. 1, according to an embodiment.

FIG. 3 is a block diagram illustrating the storage controller and the nonvolatile memory of FIG. 1, according to an embodiment.

Referring to FIG. 3, the storage device 10 may include the storage controller 200 and the nonvolatile memory 400. The storage device 10 may support a plurality of first through m-th channels CH1 through CHm, and the storage controller 200 and the nonvolatile memory 400 may be connected via the first through m-th channels CH1 through CHm. For example, the storage device 10 may be implemented as an SSD.

The nonvolatile memory 400 may include a plurality of nonvolatile memory devices (NVM11 through NVMmn). Each of the nonvolatile memory devices (NVM11 through NVMmn) may be connected to one of the first through m-th channels CH1 through CHm via a way. For example, nonvolatile memory devices NVM11 through NVM1$n$ may be connected to the first channel CH1 via ways W11 through W1n, and nonvolatile memory devices NVM21 through NVM2n may be connected to the second channel CH2 via ways W21 through W2n. Each of the nonvolatile memory devices (NVM11 through NVMmn) may be implemented as an arbitrary memory unit capable of operating in response to an individual command from the storage controller 200. For example, the nonvolatile memory devices (NVM11 through NVMmn) may be implemented as chips or dies, but the disclosure is not limited thereto.

The storage controller 200 may exchange signals with the nonvolatile memory 400 via the first through m-th channels CH1 through CHm. For example, the storage controller 200 may transmit commands CMDa through CMDm, addresses ADDRa through ADDRm, and data DATAa through DATAm to the nonvolatile memory 400 via the first channel CH1 through the m-th channel CHm or may receive the data DATAa through DATAm from the nonvolatile memory 400.

The storage controller 200 may select one of the nonvolatile memory devices (NVM11 through NVMmn) and may exchange signals with the selected nonvolatile memory device. For example, the storage controller 200 may select one of the nonvolatile memory devices NVM11 through NVM1n, which are connected to the first channel CH1, e.g., the nonvolatile memory device NVM11, and may transmit the command CMDa, the address ADDRa, and the data DATAa to the nonvolatile memory device NVM11, or receive the data DATAa from the nonvolatile memory device NVM11, via the first channel CH1.

The storage controller 200 may exchange signals with the nonvolatile memory 400 in parallel via different channels. For example, the storage controller 200 may transmit the command CMDb to the nonvolatile memory 400 via the second channel CH2 while transmitting the command CMDa to the nonvolatile memory 400 via the first channel CH1. For example, the storage controller 200 may receive the data DATAb from the nonvolatile memory 400 via the second channel CH2 while receiving the data DATAa from the nonvolatile memory 400 via the first channel CH1.

The storage controller 200 may control the general operation of the nonvolatile memory 400. The storage controller 200 may control the nonvolatile memory devices (NVM11 through NVMmn), which are connected to the first channel CH1 through the m-th channel CHm, by transmitting signals to the first channel CH1 through the m-th channel CHm. For example, the storage controller 200 may control one of the nonvolatile memory devices (NVM11 through NVMmn), selected by transmitting the command CMDa and the address ADDRa to the first channel CH1.

The nonvolatile memory devices (NVM11 through NVMmn) may operate under the control of the storage controller 200. For example, the nonvolatile memory device NVM11 may program the data DATAa in accordance with the command CMDa, the address ADDRa, and the data DATAa provided thereto via the first channel CH1. For example, the nonvolatile memory device NVM21 may read out the data DATAb in accordance with the command CMDb, the address ADDRb, and the data DATAb provided thereto via the second channel CH2, and may transmit the data DATAb to the storage controller 200.

FIG. 3 illustrates that the nonvolatile memory 400 communicates with the storage controller 200 via m channels and includes n nonvolatile memory devices for each of the m channels, but the number of channels and the number of nonvolatile memory devices connected to each of the channels may vary.

Figure 4:
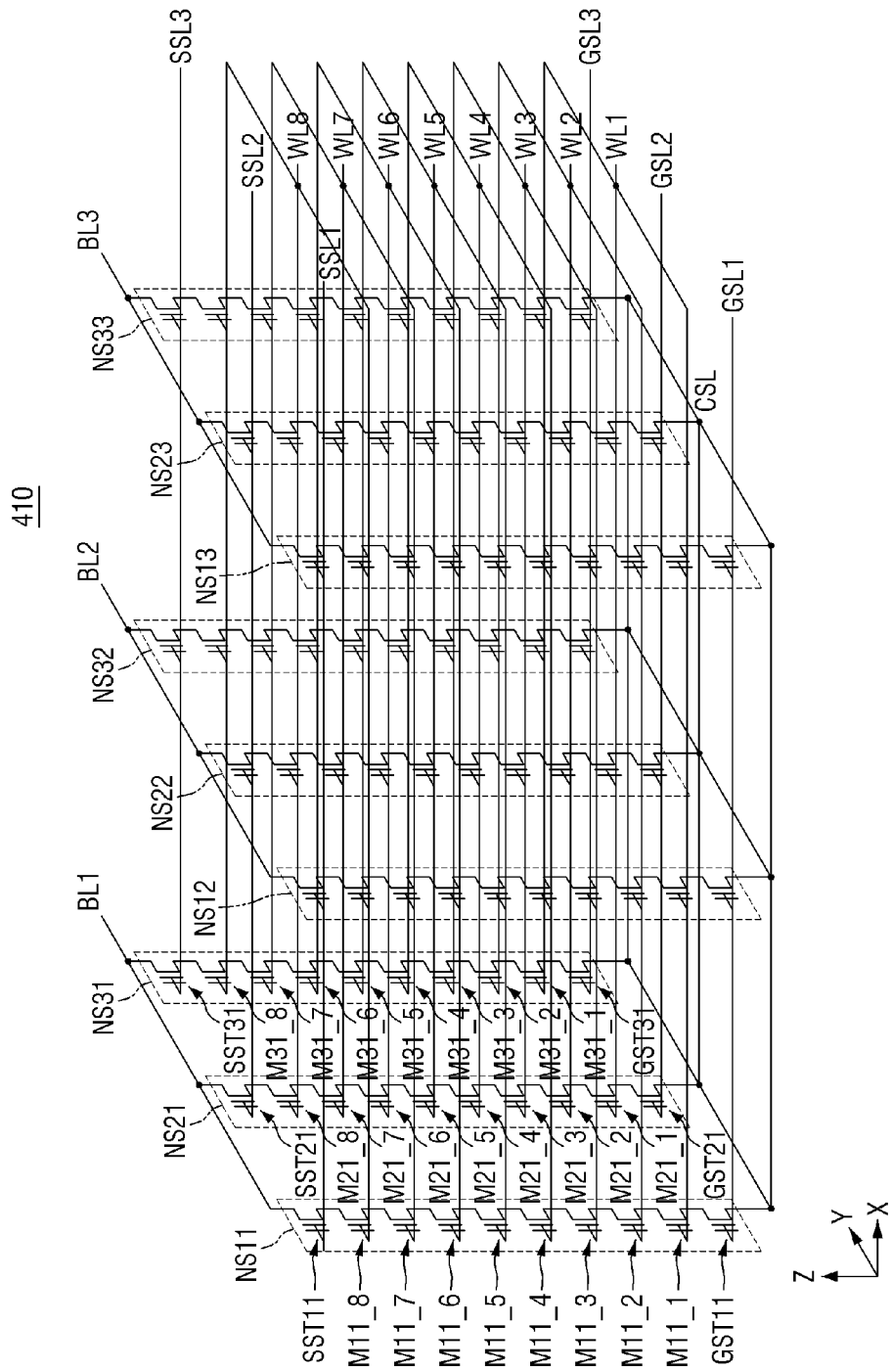
FIG. 4 is a circuit diagram illustrating a memory cell array of FIG. 2, according to an embodiment.

FIG. 4 is a circuit diagram illustrating the memory cell array of FIG. 2, according to an embodiment.

Referring to FIG. 4, a plurality of cell strings NS11, NS21, NS31, NS12, NS22, NS32, NS13, NS23, and NS33 may be disposed on a substrate in first and second directions X and Y. The cell strings NS11, NS21, NS31, NS12, NS22, NS32, NS13, NS23, and NS33 may extend in a third direction Z. The cell strings NS11, NS21, NS31, NS12, NS22, NS32, NS13, NS23, and NS33 may be connected in common to a common source line CSL, which is formed on or inside the substrate.

The common source line CSL is illustrated as being connected to the lowermost parts, in the third direction Z, of the cell strings NS11, NS21, NS31, NS12, NS22, NS32, NS13, NS23, and NS33, but the disclosure is not limited thereto. Alternatively, the common source line CSL may be connected only electrically to the lowermost parts of the cell strings NS11, NS21, NS31, NS12, NS22, NS32, NS13, NS23, and NS33 and may not necessarily be disposed at the lowermost parts of the cell strings NS11, NS21, NS31, NS12, NS22, NS32, NS13, NS23, and NS33. Also, the cell strings NS11, NS21, NS31, NS12, NS22, NS32, NS13, NS23, and NS33 may be arranged in a 3×3 matrix, but the layout and the number of cell strings included in the memory cell array 410 are not particularly limited.

Some cell strings, i.e., the cell strings NS11, NS12, and NS13, may be connected to a first ground-select line GSL1. Some cell strings, i.e., the cell strings NS21, NS22, and NS23, may be connected to a second ground-select line GSL2. Some cell strings, i.e., the cell strings NS31, NS32, and NS33, may be connected to a third ground-select line GSL3.

Some cell strings, i.e., the cell strings NS11, NS12, and NS13, may be connected to a first string-select line SSL1. Some cell strings, i.e., the cell strings NS21, NS22, and NS23, may be connected to a second string-select line SSL2. Some cell strings, i.e., the cell strings NS31, NS32, and NS33, may be connected to a third string-select line SSL3.

Each of the cell strings NS11, NS21, NS31, NS12, NS22, NS32, NS13, NS23, and NS33 may include a string-select line and a string-select transistor SST, which is connected to the string-select line. Each of the cell strings NS11, NS21, NS31, NS12, NS22, NS32, NS13, NS23, and NS33 may include a ground-select line and a ground-select transistor (GST), which is connected to the ground-select line.

First ends of the ground-select transistors of the cell strings NS11, NS21, NS31, NS12, NS22, NS32, NS13, NS23, and NS33 may be connected to the common source line CSL. A plurality of memory cells may be sequentially stacked in the third direction Z between the ground-select transistor and the string-select transistor of each of the cell strings NS11, NS21, NS31, NS12, NS22, NS32, NS13, NS23, and NS33. Although not specifically illustrated, a plurality of dummy cells may be further included between the ground-select transistor and the string-select transistor of each of the cell strings NS11, NS21, NS31, NS12, NS22, NS32, NS13, NS23, and NS33. The number of string-select transistors included in each of the cell strings NS11, NS21, NS31, NS12, NS22, NS32, NS13, NS23, and NS33 is not particularly limited.

For example, the cell string NS11 may include a ground-select transistor GST11, a plurality of memory cells M11_1 through M11_8, which are sequentially stacked in the third direction Z on the ground-select transistor GST11, and a string-select transistor SST11, which is stacked in the third direction Z on the memory cell M11_8, the cell string NS21 may include a ground-select transistor GST21, a plurality of memory cells M21_1 through M21_8, which are sequentially stacked in the third direction Z on the ground-select transistor GST21, and a string-select transistor SST21, which is stacked in the third direction Z on the memory cell M21_8, and the cell string NS31 may include a ground-select transistor GST31, a plurality of memory cells M31_1 through M31_8, which are sequentially stacked in the third direction Z on the ground-select transistor GST31, and a string-select transistor SST31, which is stacked in the third direction Z on the memory cell M31_8. The other cell strings may have a similar structure to the cell strings NS11, NS21, and NS31.

Memory cells at the same height, in the third direction Z, from the substrate or the ground-select transistors of the cell strings NS11, NS21, NS31, NS12, NS22, NS32, NS13, NS23, and NS33 may be electrically connected in common via their respective word lines WL. For example, the memory cells M11_1, M21_1, and M31_1, which are at the same height, may be connected to a first word line WL1, and the memory cells M11_2, M21_2, and M31_2, which are at the same height, may be connected to a second word line WL2. The layout and the structure of memory cells connected to each of third through eighth word lines WL3 through WL8 may be similar to the layout and the structure of the memory cells M11_1, M21_1, and M31_1 or M11_2, M21_2, and M31_2, and thus, detailed descriptions thereof will be omitted.

A first end of the string-select transistor of each of the cell strings NS11, NS21, NS31, NS12, NS22, NS32, NS13, NS23, and NS33 may be connected to a first, second, or third bit line BL1, BL2, and BL3. For example, the string-select transistors SST11, SST21, and SST31 may be connected to the first bit line BL1, which extends in the second direction Y. String-select transistors connected to each of the second or third bit lines BL2 or BL3 may be similar to the string-select transistors SST11, SST21, and SST31, and thus, detailed descriptions thereof will be omitted.

Memory cells corresponding to one string-select line (ground-select line) and one word line may form a page. Write and read operations may be performed in units of pages. Each of the memory cells of each page may store two or more bits. Bits written to each of the memory cells of each page may form a logical page.

The memory cell array 410 may be provided as a 3D memory array. The 3D memory array may be monolithically formed in one or more physical levels of arrays of memory cells having an active area disposed above a substrate (not illustrated) and circuitry associated with the operation of those memory cells, and the circuitry may be located above or within the substrate. The term "monolithic," as used herein, means that layers of each level of the 3D memory array are directly deposited on the layers of each underlying level of the 3D memory array.

Figure 5:
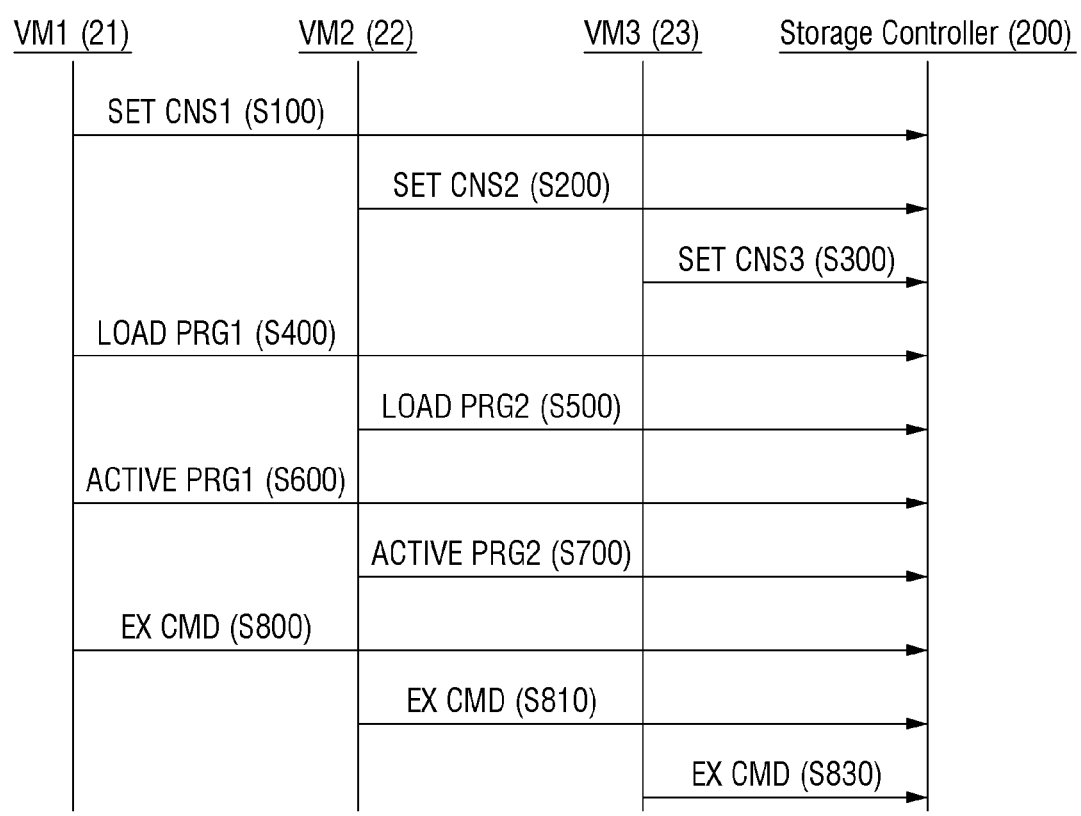
FIG. 5 is a flowchart illustrating operation of a memory system, according to an embodiment.

FIG. 5 is a flowchart illustrating an operation of a memory system, according to an embodiment. FIGS. 6 through 20 illustrate the operation of the memory system of FIG. 5, according to embodiments.

Referring to FIGS. 1 and 5, a first virtual machine 21 (VM1), which is associated with a first tenant, sends a setting instruction instructing setting of a first computing namespace CNS1, which is for processing a command from the first virtual machine 21, to a storage controller 200 (S100).

The host device 20 may include the first virtual machine 21, a second virtual machine 22, and a third virtual machine 23. That is, each of the first, second, and third virtual machines 21, 22, and 23 may independently function as the host device 20.

Figure 6:
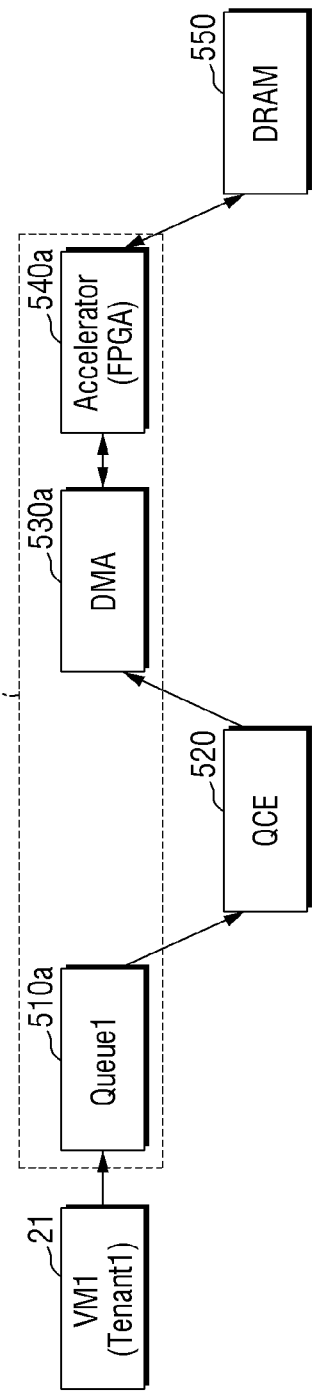

Referring to FIGS. 5 and 6, the storage controller 200 sets the first computing namespace CNS1 in a storage device, which is referred to as the storage device 10 of FIG. 1, herebelow.

In an embodiment, the first computing namespace CNS1 may include a command queue 510a, a DMA engine 530a, and an accelerator 540a, but the disclosure is not limited thereto. Although not specifically illustrated, the first computing namespace CNS1 may further include other elements. The DMA engine 530a may correspond to the DMA engine 219 shown in FIG. 1, and the accelerator 540a may corresponds to an accelerator included in the FPGA 100 shown in FIG. 1.

The command queue 510a may store an execute command, for driving the accelerator 540a, which is received from the first virtual machine 21. In an embodiment, the execute command may conform to the NVMe standard, for example, the NVMe Technical Proposal (TP) or the NVMe TP 4091 Computational Program Command Set Specification, but the disclosure is not limited thereto.

When multiple execute commands are received from the first virtual machine 21, the command queue 510a may sequentially store the execute commands, and may output the stored execute commands in, for example, a first in, first out (FIFO) method.

In an embodiment, the command queue 510a may be configured in, for example, a buffer memory. In an embodiment, the command queue 510a may be implemented in a buffer memory with the use of an SRAM, but the disclosure is not limited thereto. This buffer memory may correspond to the buffer memory 216 shown in FIG. 1.

The queue control engine 520 may manage the execute command stored in the command queue 510a. The queue control engine 520 may fetch the execute command stored in the command queue 510a, and may control the accelerator 540a to perform a computation in accordance with the fetched execute command. The queue control engine 520 may correspond to the queue control engine 220 shown in FIG. 1.

If the accelerator 540a is determined to be idle or available to perform computations, the queue control engine 520 may control the accelerator 540a to perform a computation in accordance with the fetched execute command. On the contrary, if the accelerator 540a is determined to be busy, the queue control engine 520 may search for and find another available accelerator and control the available accelerator to perform a computation in accordance with the fetched execute command. According to an embodiment, the computation performed by the available accelerator may use the same program or a different program that was to be used for the computation by the busy accelerator 540a. Herein, an accelerator being busy may refer to a status in which the accelerator is currently being used by an execute command.

In an embodiment, the queue control engine 520 may manage the command queue 510a as a circular queue, and may recognize that a new execute command has been stored if a queue index of the command queue 510a has increased.

In an embodiment, the queue control engine 520, like the queue control engine 220 of FIG. 1, may be implemented in the storage controller 200, but the disclosure is not limited thereto.

The DMA engine 530a may read or fetch data from a buffer memory 550 such that the accelerator 540a may perform a computation in accordance with an execute command. The buffer memory 550 may correspond to the buffer memory 300 shown in FIG. 1. In an embodiment, the DMA engine 530a, like the DMA engine 219 of FIG. 1, may be implemented in the storage controller 200, but the disclosure is not limited thereto.

The accelerator 540a may be implemented as or in, for example, an FPGA, or using, for example, an FPGA, and may process a computation in accordance with an execute command, under the control of the queue control engine 520. In an embodiment, the FPGA 100 of FIG. 1 may be used to implement the accelerator 540a. In an embodiment, a plurality of accelerators may be provided, and may be used to set different computing namespaces.

The buffer memory 550 may provide computational data for the accelerator 540a to process a computation in accordance with an execute command, and may store the result of the processing performed by the accelerator 540a. In an embodiment, the buffer memory 550 may be implemented as, for example, a DRAM. In an embodiment, the buffer memory 550 may be implemented using the buffer memory 300 of FIG. 1, but the disclosure is not limited thereto.

The command queue 510a, the queue control engine 520, the DMA engine 530a, and the accelerator 540a have been described above as being implemented as hardware, but the disclosure is not limited thereto. Alternatively, at least one of the command queue 510a, the queue control engine 520, the DMA engine 530a, and the accelerator 540a may be implemented and run as software and/or firmware, or a combination of hardware, software and/or firmware.

In response to the setting instruction from the first virtual machine 21, the storage controller 200 may set or allocate at least one computational resource in the storage device 10 as the first computing namespace CNS1, which is for processing a command from the first virtual machine 21. The first computing namespace CNS1 may be an NVMe computing namespace, but the disclosure is not limited thereto. Herein, a computational resource may refer to at least one of a DMA engine, an accelerator, and a queue control engine, and a buffer memory.

The first computing namespace CNS1, which refers to a set of at least one computational resource in the storage device 10 for processing a command from the first virtual machine 21 in response to the setting instruction from the first virtual machine 21, is a different concept from an NVM namespace for dividing and managing the area of the nonvolatile memory 400 or a memory namespace for dividing and managing the area of the buffer member 300 of FIG. 1.

Figure 7:
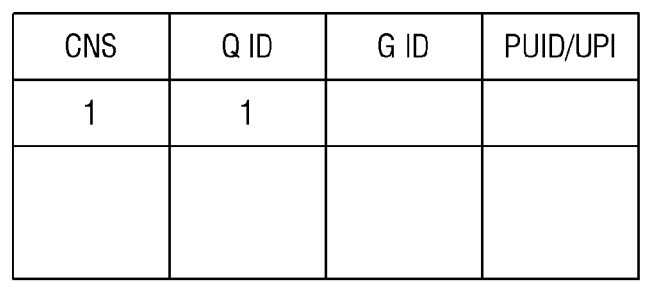

Referring to FIGS. 6 and 7, after the first computing namespace CNS1 is set, the queue control engine 520 may set a queue ID (Q ID) of the first computing namespace CNS1 to, for example, 1. Accordingly, a queue ID (Q ID) of the accelerator 540a included in the first computing namespace CNS1 is mapped to 1.

In an embodiment, the queue control engine 520 allocates and manages a queue ID (Q ID) whenever a computing namespace is set, and this will be described later.

When setting of the first computing namespace CNS1 is complete, the storage controller 200 sends a response indicating that setting of the first computing namespace CNS1 is complete to the first virtual machine 21.

Referring to FIGS. 1 and 5, a second virtual machine 22 (VM2), which is associated with a second tenant, sends a setting instruction instructing setting of a second computing namespace CNS2, which is for processing a command from the second virtual machine 22, to the storage controller 200 (S200).

Figure 8:
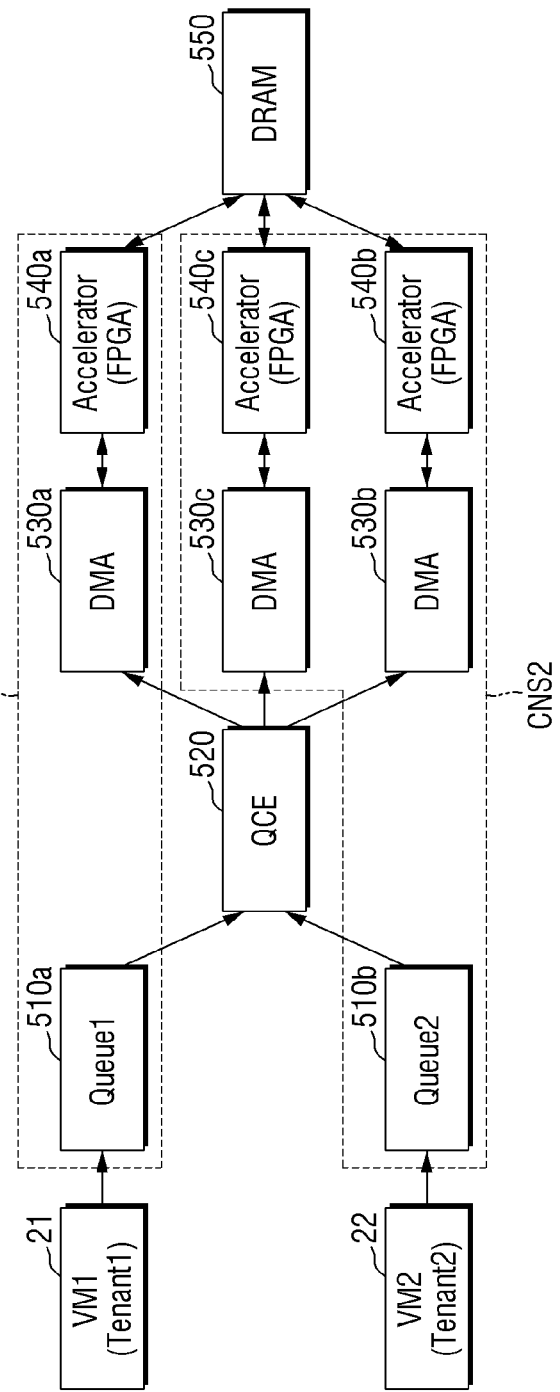

Referring to FIG. 8, the storage controller 200 sets the second computing namespace CNS2 in the storage device 10.

In an embodiment, the second computing namespace CNS2 may include a command queue 510b, DMA engines 530b and 530c, and accelerators 540b and 540c. The DMA engines 530b and 530C may each correspond to the DMA engine 219 shown in FIG. 1, and the accelerators 540b and 540c may correspond to accelerators included in the FPGA 100 shown in FIG. 1.

The command queue 510b may store an execute command for driving the accelerators 540b and 540c, received from the second virtual machine 22.

The queue control engine 520 may manage the execute command stored in the command queue 510b. The queue control engine 520 may fetch the execute command stored in the command queue 510b, and may control at least one of the accelerators 540b and 540c to perform a computation in accordance with the fetched execute command.

If the accelerator 540b is determined to be idle or available to perform computations, the queue control engine 520 may control the accelerator 540b to perform a computation in accordance with the fetched execute command. On the contrary, if the accelerator 540b is determined to be busy, the queue control engine 520 may determine whether the accelerator 540c is idle or available and may control the accelerator 540c to perform a computation in accordance with the fetched execute command. According to an embodiment, the computation performed by the accelerator 540C may use the same program or a different program as the computation that was to be performed by the busy accelerator 540b.

The DMA engine 530b may read or fetch data from the buffer memory 550 such that the accelerator 540b may perform a computation in accordance with an execute command. The DMA engine 530c may read or fetch data from the buffer memory 550 such that the accelerator 540c may perform a computation in accordance with an execute command.

In response to the setting instruction from the second virtual machine 22, the storage controller 200 may set or allocate at least one computational resource in the storage device 10 as the second computing namespace CNS2, which is for processing a command from the second virtual machine 22.

Figure 9:
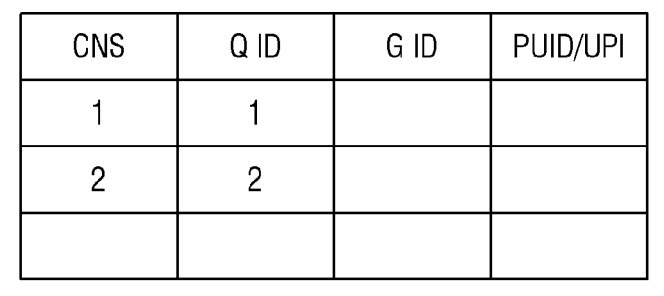

Referring to FIGS. 8 and 9, after setting of the second computing namespace CNS2, the queue control engine 520 may set a queue ID (Q ID) of the second computing namespace CNS2 to, for example, 2. Accordingly, queue IDs (Q ID) of the accelerators 540b and 540c included in the second computing namespace CNS2 are mapped to 2. This means that the accelerators 540b and 540c process computations in accordance with the execute command fetched from the command queue 510b.

When setting of the second computing namespace CNS2 is complete, the storage controller 200 sends a response indicating that setting of the second computing namespace CNS2 is complete to the second virtual machine 22.

Referring to FIGS. 1 and 5, a third virtual machine 23 (VM3), which is associated with a third tenant, sends a setting instruction instructing setting of a third computing namespace CNS3, which is for processing a command from the third virtual machine 23, to the storage controller 200 (S300).

Figure 10:
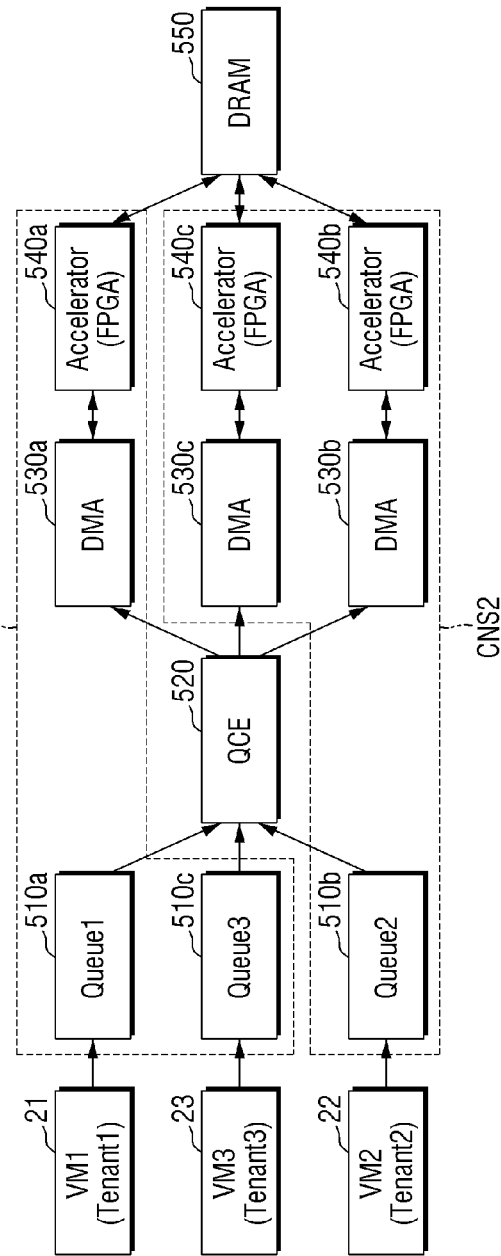

Referring to FIG. 10, the storage controller 200 sets the third computing namespace CNS3 in the storage device 10.

In an embodiment, the third computing namespace CNS3 may include a command queue 510c, the DMA engine 530a, and the accelerator 540a.

The command queue 510c may store an execute command for driving the accelerator 540a, received from the third virtual machine 23.

The queue control engine 520 may manage the execute command stored in the command queue 510c. The queue control engine 520 may fetch the execute command stored in the command queue 510c, and may control the accelerator 540a to perform a computation in accordance with the fetched execute command.

In response to the setting instruction from the third virtual machine 23, the storage controller 200 may set or allocate at least one computational resource in the storage device 10 as the third computing namespace CNS3, which is for processing a command from the third virtual machine 23.

Figures 11, 12:
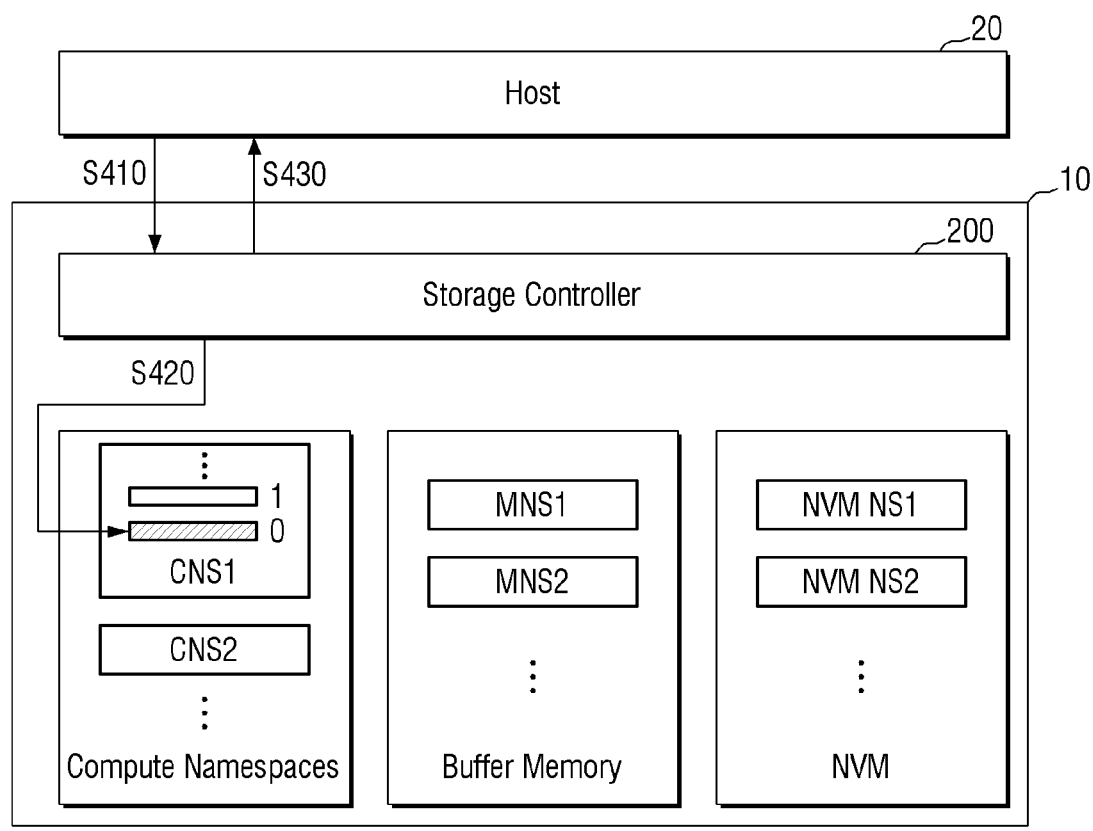

Referring to FIGS. 10 and 11, after setting the third computing namespace CNS3, the queue control engine 520 may set a queue ID (Q ID) of the third computing namespace CNS3 to, for example, 1. This means that the accelerator 540a processes a computation in accordance with both the execute command fetched from the command queue 510c and the execute command fetched from the command queue 510a.

When setting of the third computing namespace CNS3 is complete, the storage controller 200 sends a response indicating that setting of the third computing namespace CNS3 is complete to the third virtual machine 23.

In the above embodiments, the first to third computing namespaces CNS1, CNS2 and CNS3 are sequentially set by the setting instructions of the first to third virtual machines 21, 22 and 23, respectively. However, the order of setting these computing namespaces may be different from the above, or these computing namespaces may be set at the same time, according to embodiments.

Referring to FIGS. 1 and 5, after setting of the first to third computing namespaces CNS1, CNS2 and CNS3 is complete, the first virtual machine 21 sends an instruction to the storage controller 200 to load a first program to be used in the first computing namespace CNS1 (S400).

For example, referring to FIG. 12, the first virtual machine 21 of the host device 20 sends an instruction to the storage controller 200 to load the first program in a zeroth slot of the first computing namespace CNS1 (S410). In response to the instruction sent by the first virtual machine 21, the storage controller 200 loads the first program in the zeroth slot of the first computing namespace CNS1 (S420) and sends a response indicating that loading of the first program is complete to the first virtual machine 21 of the hots device 20 (S430).

The first and second computing namespaces CNS1 and CNS2 of FIG. 12, which are defined using the computational resources in the storage device 10, are a different concept from NVM namespaces NVM NS1 and NVM NS2, which are for dividing and managing the area of a nonvolatile memory NVM, and memory namespaces MNS1 and MNS2, which are for dividing and managing the area of a buffer memory Buffer Memory.

Referring to FIGS. 1 and 5, the second virtual machine 22 sends an instruction to the storage controller 200 to load a second program to be used in the second computing namespace CNS2 (S500). In response to the instruction sent by the second virtual machine 22, the storage controller 200 loads the second program in a zeroth slot of the second computing namespace CNS2 and sends a response indicating that loading of the second program is complete to the second virtual machine 22.

Only one program may be loaded into each computing namespace, but the disclosure is not limited thereto. A program loading operation may be performed more than one time so that multiple programs may be loaded in different slots of each computing namespace. Further, the second program is loaded after the first program is loaded in the above embodiment. However, the order of loading the first and second programs may be different from the above, or these programs may be loaded at the same time, according to embodiments.

The first and third virtual machines 21 and 23 have been described as using the same accelerator, i.e., the accelerator 540a, to perform the respective computations in accordance with the respective execute commands, and for convenience, only the first and second virtual machines 21 and 22 are illustrated as sending instructions to load the first and second programs, respectively. However, any two of the first to third virtual machines 21, 22 and 23 may use a same accelerator to perform respective computations in accordance with respective execute commands, and the third virtual machine 23 may also send an instruction to the storage controller 200 to load a necessary program, according to embodiments.

Thereafter, referring to FIGS. 1 and 5, the first virtual machine 21 sends an instruction to the storage controller 200 to activate the loaded first program (S600).

Figure 13:
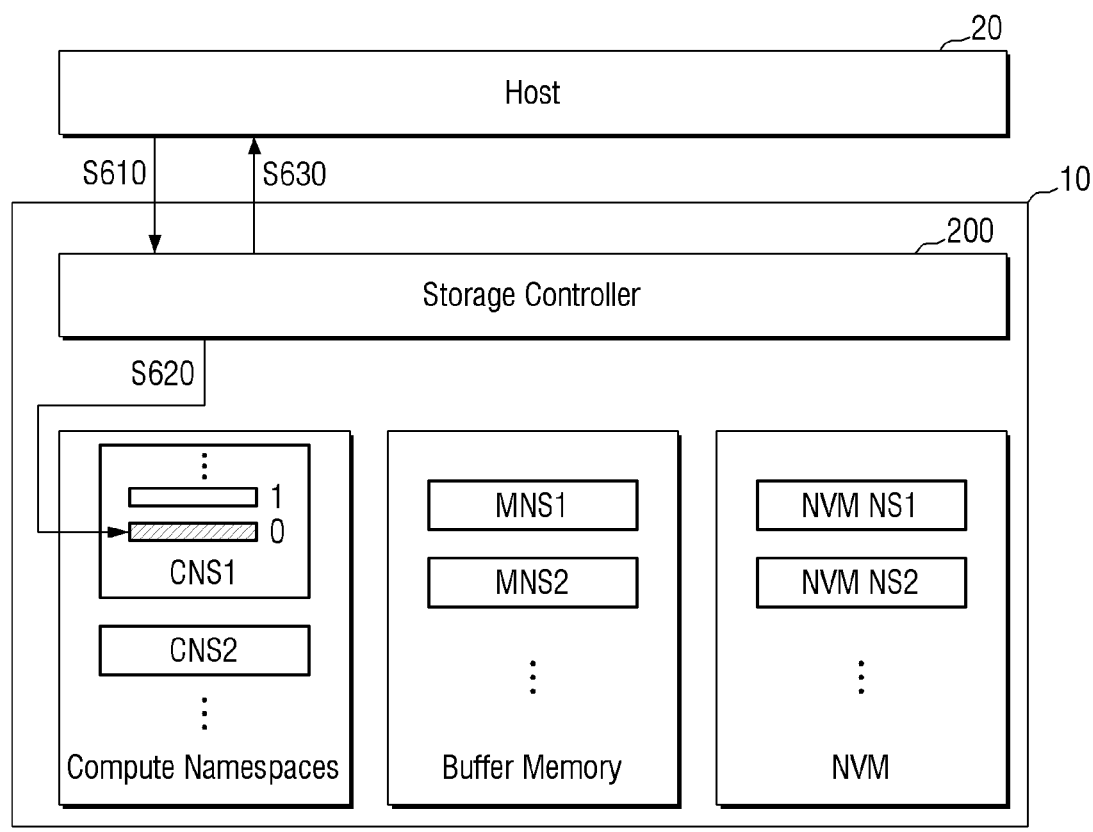

For example, referring to FIG. 13, the first virtual machine 21 of the host device 20 sends an instructions to the storage controller 200 to activate the first program loaded in the zeroth slot of the first computing namespace CNS1 (S610). In response to the instruction sent by the first virtual machine 21, the storage controller 200 activates the first program loaded in the zeroth slot of the first computing namespace CNS1 (S620) and sends a response indicating that activation of the first program is complete to the first virtual machine 21 of the host device 20 (S630).

If there are multiple programs loaded in the first computing namespace CNS1, the first virtual machine 21 of the host device 20 may activate one of the multiple programs.

In the process of activating a program loaded in each computing namespace, the queue control engine 520 may set or determine a group ID (G ID) of each computing namespace based on the ID of the program to be activated. This will hereinafter be described with reference to FIG. 14. Here, the program to be activated refers to a program to be activated by an instruction of the virtual machine.

Figures 14, 15:
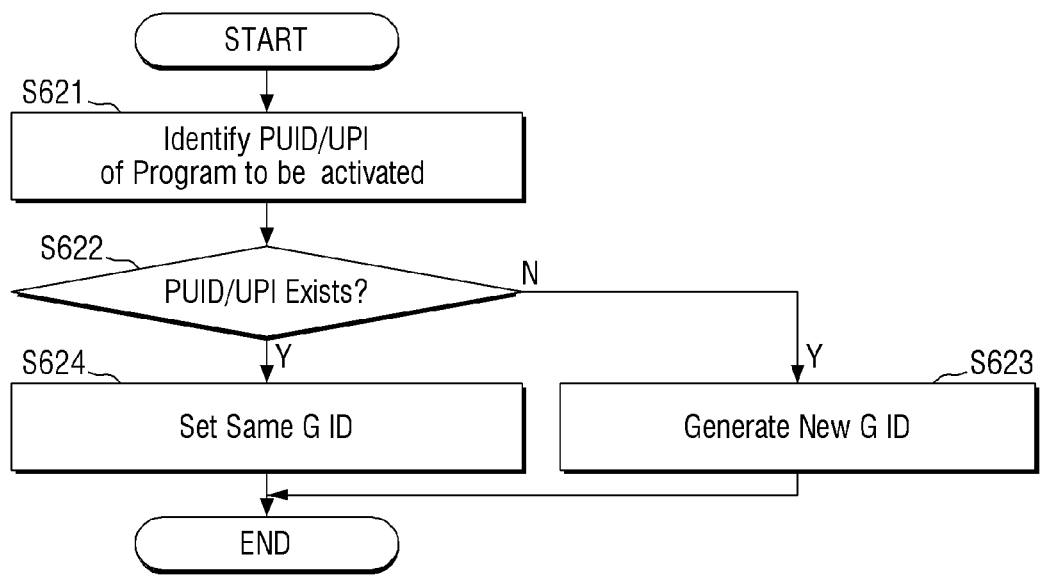

Referring to FIG. 14, the ID of a program to be activated is identified (S621).

The ID of the program to be activated may be a program unique ID (PUID) or a unique program identifier (UPI), but the disclosure is not limited thereto.

Thereafter, a determination is made as to whether the ID of the program to be activated already exists (S622). If the ID of the program to be activated does not exist (S622—N), a new group ID (G ID) is generated (S623). If the ID of the program to be activated already exists (S622—Y), an existing group ID (G ID) is set (S624).

Referring to FIGS. 10 and 15, if the ID of the first program instructed by the first virtual machine 21 to be activated is "a", which does not exist, the queue control engine 520 may set the group IDs (G ID) of the first and third computing namespaces CNS1 and CNS3 to 1. Accordingly, the group ID (G ID) of the accelerator 540a included in the first and third computing namespaces CNS1 and CNS3 is mapped to 1.

Thereafter, referring to FIGS. 1 and 5, the second virtual machine 22 sends an instruction to the storage controller 200 to activate the loaded second program (S700).

If there are multiple programs loaded in the second computing namespace CNS2, the second virtual machine 22 of the host device 20 may activate one of the multiple programs.

Referring to FIGS. 10, 14, and 16, if the ID of the second program instructed by the second virtual machine 22 to be activated is "a", which already exists, the queue control engine 520 may set the group ID (G ID) of the second computing namespace CNS2 to 1 (S624).

Accordingly, the group ID (G ID) of the accelerators 540*b* and 540*c* included in the second computing namespace CNS2 is mapped to 1.

Accelerators mapped to the same group ID (G ID) perform computations using the same program in accordance with an execute command.

Thereafter, referring to FIGS. 1 and 5, the first virtual machine 21 transmits an execute command using the activated first program to the storage controller 200 (S800), the second virtual machine 22 transmits an execute command using the activated second program to the storage controller 200 (S810), and the third virtual machine 23 transmits an execute command using an activated program to the storage controller 200 (S820).

Referring to FIG. 10, the queue control engine 520 fetches the execute command stored in each of the command queues 510*a*, 510*b*, and 510*c*, and controls the accelerators 540*a*, 540*b*, and 540*c*, using queue IDs (Q ID) and group IDs (G ID), to perform computations in accordance with the fetched execute commands. This will hereinafter be described with reference to FIG. 17.

Referring to FIG. 17, a determination is made as to whether an accelerator mapped to the same queue ID (Q ID) as a command queue from which an execute command has been fetched is busy (S831).

If the accelerator is not busy (S831—N), the accelerator mapped to the queue ID (Q ID) is controlled to perform a computation in accordance with the execute command fetched from the command queue (S832).

If the accelerator is busy (S831—Y), a determination is made as to whether another accelerator mapped to the same group ID (G ID) as the busy accelerator is also busy (S833).

If the accelerator mapped to the group ID (G ID) as the busy accelerator is also busy (S833—Y), it means that currently, there is no available accelerator, and a determination is made again as to whether the busy accelerator mapped to the Q ID is still busy (S831) after waiting until the busy accelerator becomes available.

If the accelerator mapped to the group ID (G ID) as the busy accelerator is not busy (S833—N), the accelerator mapped to the same group ID (G ID) as the busy accelerator is controlled to perform a computation in accordance with the execute command fetched from the command queue (S834).

Figure 18:
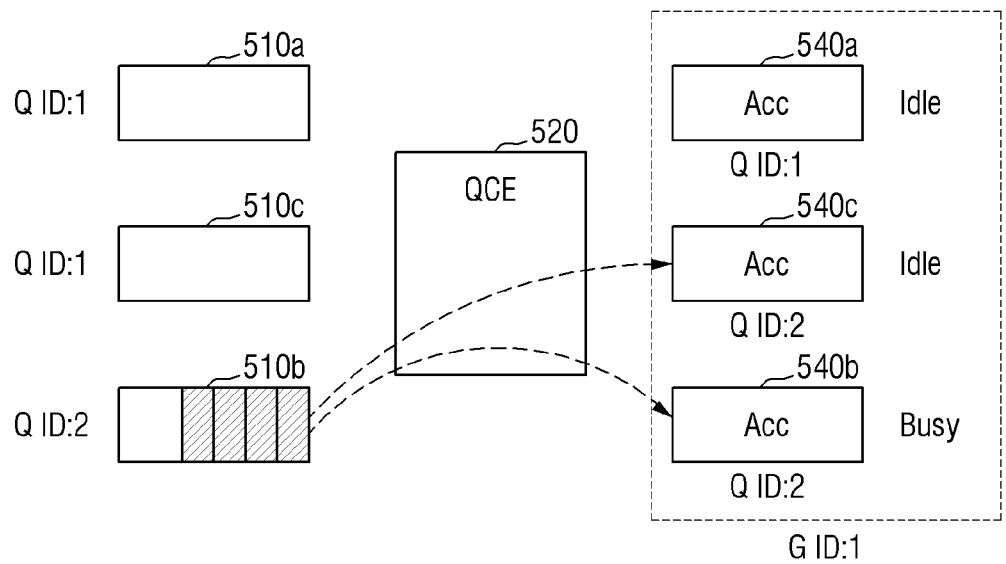

For example, referring to FIG. 18, the queue control engine 520 fetches an execute command from the command queue 510*b*, which has a queue ID (Q ID) of 2, and determines whether the accelerator 540*b*, which also has a queue ID (Q ID) of 2, is busy. As the accelerator 540*b* is busy, the queue control engine 520 determines whether the accelerator 540*c*, which also has a queue ID (Q ID) of 2, is busy. As the accelerator 540*c* is not busy, the queue control engine 520 controls the accelerator 540*c* to perform a computation in accordance with the execute command fetched from the command queue 510*b*.

Figure 19:
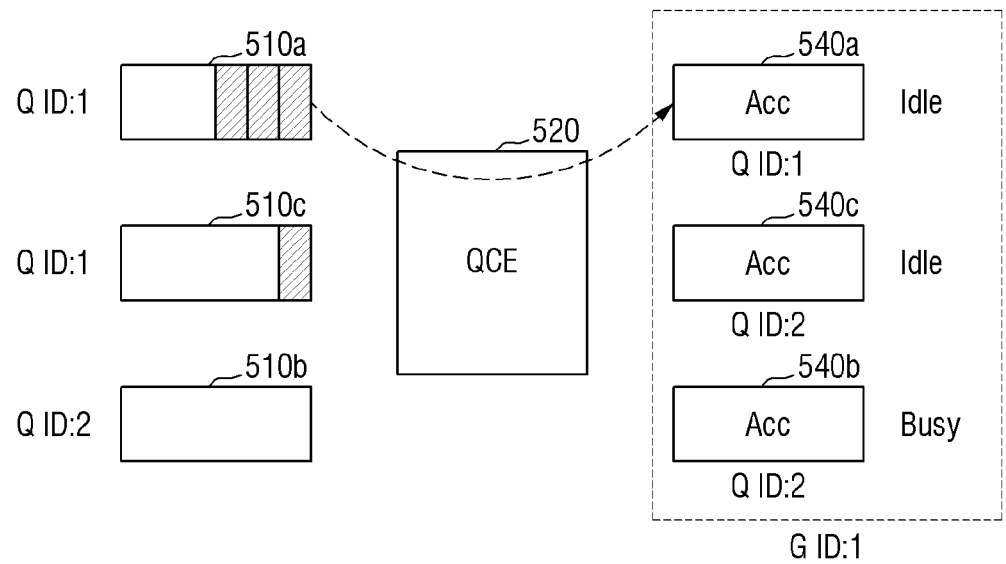

Referring to FIG. 19, the queue control engine 520 fetches an execute command from the command queue 510*a*, which has a queue ID (Q ID) of 1, and determines whether the accelerator 540*a*, which also has a queue ID (Q ID) of 1, is busy. As the accelerator 540*a* is not busy, the queue control engine 520 controls the accelerator 540*a* to perform a computation in accordance with the execute command fetched from the command queue 510*a*.

Figure 20:
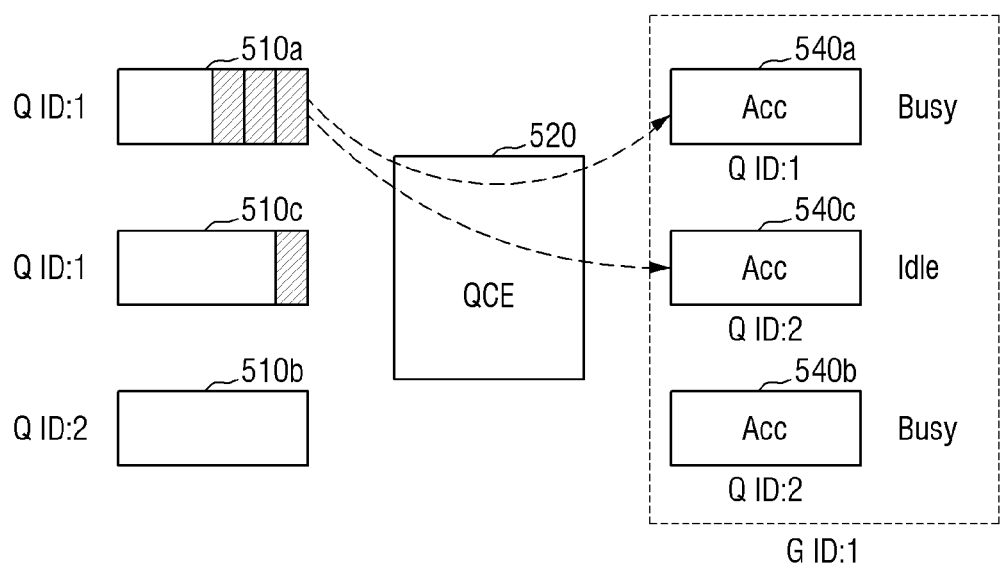

Referring to FIG. 20, the queue control engine 520 fetches an execute command from the command queue 510*a*, which has a queue ID (Q ID) of 1, and determines whether the accelerator 540*a*, which also has a queue ID (Q ID) of 1, is busy. The accelerator 540*a* is busy, but there is no other accelerator having a queue ID (Q ID) of 1.

Thus, the queue control engine 520 determines whether the accelerators 540*b* and 540*c*, which have a queue ID (Q ID) different from that of the accelerator 540*a* but have the same group ID (G ID) as the accelerator 540*a*, are busy. As the accelerator 540*c* is not busy, the queue control engine 520 controls the accelerator 540*c* to perform a computation in accordance with the execute command fetched from the command queue 510*a*.

In an embodiment, the queue control engine 520 may identify the number of execute commands stored in the command queue 510*b*, which is associated with the accelerators 540*b* and 540*c*, when determining whether the accelerators 540*b* and 540*c* are busy.

If there are only few execute commands stored in the command queue 510*b* and the accelerator 540*c* are not busy, the queue control engine 520 controls the accelerator 540*c*, which has a group ID (G ID) of 1, to perform a computation in accordance with the execute command fetched from the command queue 510*a*. As already mentioned above, accelerators having the same group ID (G ID) perform computations using the same program. Thus, the accelerator 540*c* may be able to perform a computation in accordance with the execute command fetched from the command queue 510*a*.

A latency threshold value is set in a computing namespace set in a storage device, for each host device (or virtual machine), and if the amount of time that it takes to process a computation in accordance with an execute command exceeds the latency threshold value, the host device (or virtual machine) is notified in advance. Thus, the host device (or virtual machine) may perform any necessary subsequent process for latency control.

Accordingly, latency can be properly controlled even in an environment where a plurality of host devices (or virtual machines) compete for a computing namespace in a storage device.

Referring to FIG. 10, if the first, second, and third virtual machines 21, 22, and 23 perform computations by setting the first, second, and third computing namespaces CNS1, CNS2, and CNS3 in the storage device 10, respectively, a control device (or control software) for controlling the operation of the storage device 10 needs to monitor the execute commands stored in each of the command queues 510*a*, 510*b*, and 510*c* and control the accelerators 540*a*, 540*b*, and 540*c* to efficiently process computations in accordance with the execute commands stored in each of the command queues 510*a*, 510*b*, and 510*c*.

In this case, as the number of computing namespaces increases, the number of items to be monitored and controlled also increases, incurring a considerable amount of overhead in the control device (or control software).

However, in the embodiment of FIGS. 5 and 20, the queue control engine 520 sets a queue ID (Q ID) whenever each computing namespace is set, and sets a group ID (G ID) whenever a program is activated in each computing namespace. Then, the queue control engine 520 quickly selects and controls accelerators to process computations in accordance with execute commands, based on queue IDs (Q ID) and group IDs (G ID). As a result, degradation of the operating performance of a computational storage device can be prevented. Also, the operating performance of a computational storage device can be improved.

Figure 21:
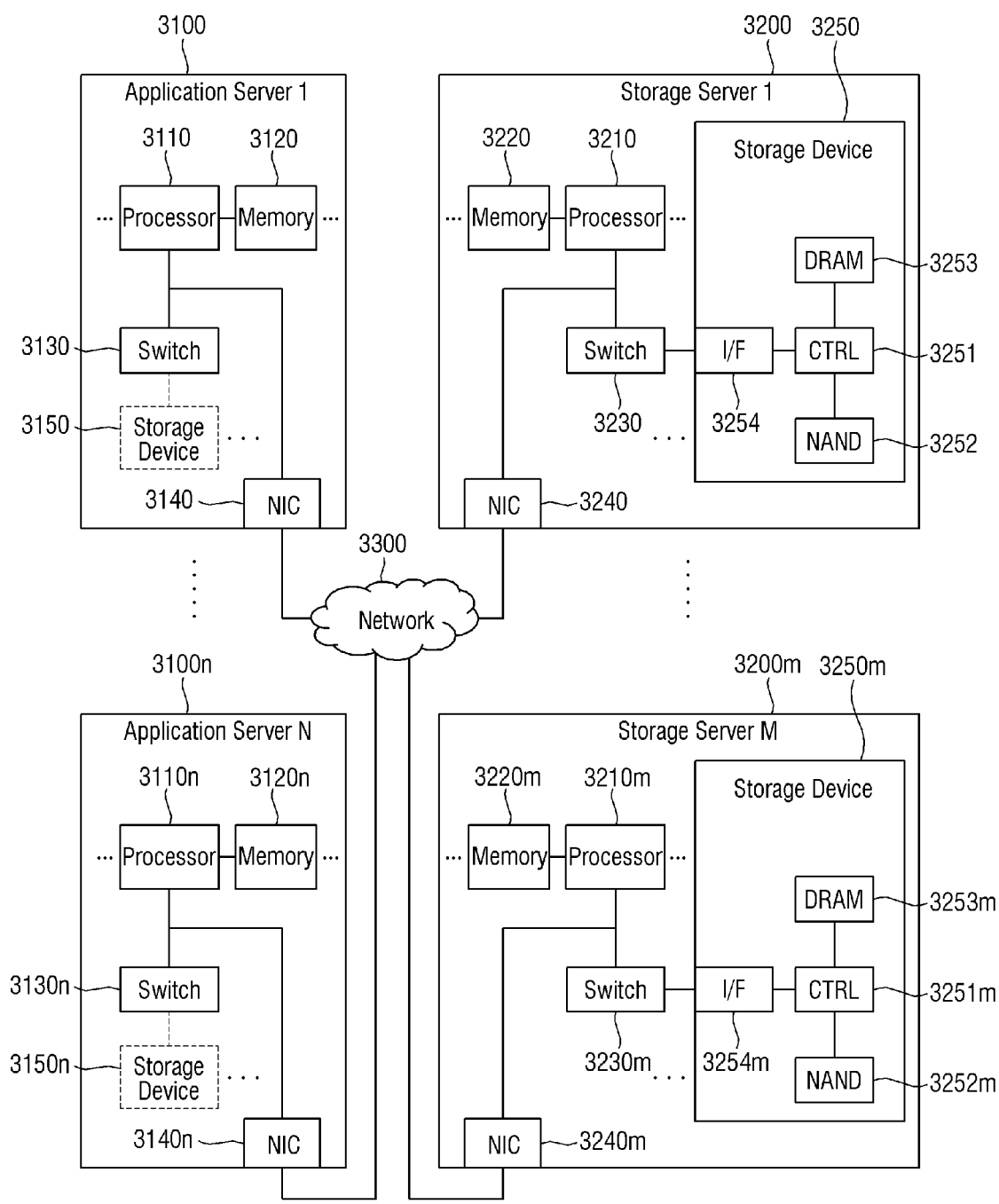
FIG. 21 is a block diagram of a data center including a storage device, according to an embodiment.

FIG. 21 is a block diagram of a data center including a memory device, according to an embodiment.

Referring to FIG. 21, a data center 3000, which is a facility that collects various types of data and provides services, may also be referred to as a data storage center. The data center 3000 may be a system for operating a search engine and a database, and may be a computing system used in a business such as a bank or a government institution. The data center 3000 may include application servers 3100 through 3100n and storage servers 3200 through 3200m. The number of application servers 3100 through 3100n and the number of storage servers 3200 through 3200m may vary and may differ from each other.

The application server 3100 may include at least one of a processor 3110 and a memory 3120, and the storage server 3200 may include at least one of a processor 3210 and a memory 3220. The processor 3210 may control the general operation of the storage server 3200 and may access the memory 3220 to execute instructions and/or data loaded in the memory 3220. The memory 3220 may be a DDR SDRAM, a high-bandwidth memory (HBM), a hybrid memory cube (HMC), a dual in-line memory module (DIMM), an Optane DIMM, and/or a nonvolatile DIMM (NVDIMM). The numbers of processors 3210 and memories 3220 included in the storage server 3200 may vary. The processor 3210 and the memory 3220 may provide a processor-memory pair. The number of processors 3210 and the number of memories 3220 may differ from each other. The processor 3210 may be a single-core processor or a multi-core processor. The above description of the storage server 3200 may also be applicable to the application server 3100. The application server 3100 may not include a storage device 3150. The storage server 3200 may include at least one storage device 3250. The number of storage devices 3250 included in the storage server 3200 may vary.

In an embodiment, the storage device 3250 may include the storage device 10 of any one of FIGS. 1 through 20. That is, the storage device 3250 may receive execute commands from a plurality of host devices (or virtual machines) and quickly selects accelerators to process computations in accordance with the execute commands, based on queue IDs and group IDs.

The application servers 3100 through 3100n and the storage servers 3200 through 3200m may communicate with one another via a network 3300. The network 3300 may be implemented using Fiber Channel (FC) or Ethernet. FC is a medium for use in high-speed data transmissions and may use optical switches providing high performance and high availability. The storage servers 3200 through 3200m may be provided as file storages, block storages, or object storages depending on an access method of the network 3300.

The network 3300 may be a storage-only network such as a storage area network (SAN). For example, the SAN may be an FC-SAN that uses an FC network and is implemented in accordance with the FC (FCP). In another example, the SAN may be an IP-SAN that uses a TCP/IP network and is implemented in accordance with the SCSI over TCP/IP protocol or the Internet SCSI (iSCSI) protocol. In another example, the network 3300 may be a generic network such as a TCP/IP network. In another example, the network 3300 may be implemented in accordance with the FC over Ethernet (FCoE) protocol, the Network Attached Storage (NAS) protocol, or the NVMe over Fabrics (NVMe-oF) protocol.

The application server 3100 and the storage server 3200 will hereinafter be described. The description of the application server 3100 may also be applicable to the rest of the application servers 3100 through 3100n, and the description of the storage server 3200 may also be applicable to the rest of the storage servers 3200 through 3200m.

The application server 3100 may store data requested by the user or a client in one of the storage servers 3200 through 3200m through the network 3300. Also, the application server 3100 may acquire data requested by the user or the client from one of the storage servers 3200 through 3200m through the network 3300. For example, the application server 3100 may be implemented as a web server or a database management system (DBMS).

The application server 3100 may access a memory 3120n or a storage device 3150n of the application server 3100n through the network 3300 or may access memories 3220 through 3220m or storage devices 3250 through 3250m of the storage servers 3200 through 3200m through the network 3300. In this manner, the application server 3100 may perform various operations on data stored in the application servers 3100 through 3100n and/or the storage servers 3200 through 3200m. For example, the application server 3100 may execute an instruction to move or copy data between the application servers 3100 through 3100n and/or between the storage servers 3200 through 3200m. Here, the data may be transferred from the storage devices 3250 to 3250m of the storage servers 3200 to 3200m to the memories 3120 through 3120n of the application servers 3100 through 3100n directly or through the memories 3220 through 3220m of the storage servers 3200 through 3200m. Data transferred through the network 3300 may be encrypted data for security or privacy.

An interface 3254 of the storage server 3200 may provide a physical connection between the processor 3210 and a controller 3251 and a physical connection between a network interconnect (NIC) 3240 and the controller 3251. For example, the interface 3254 may be implemented as a direct attached storage (DAS) directly connected to the storage device 3250 via a dedicated cable. Also, for example, the interface 3254 may be implemented as an ATA interface, a SATA interface, an e-SATA interface, a SCSI, a SAS interface, a PCI interface, a PCIe interface, an NVMe interface, an IEEE 1394 interface, a USB interface, an SD card interface, an MMC interface, an eMMC interface, a UFS interface, an eUFS interface, or a CF card interface.

The storage server 3200 may further include a switch 3230 and the NIC 3240. The switch 3230 may selectively connect the processor 3210 and the storage device 3250 and the NIC 3240 and the storage device 3250 under the control of the processor 3210.

The NIC 3240 may include a network interface card, a network adaptor, and the like. The NIC 3240 may be connected to the network 3300 via a wired interface, a wireless interface, a Bluetooth interface, or an optical interface. The NIC 3240 may include an internal memory, a digital signal processor (DSP), a host bus interface, and the like and may be connected to the processor 3210 and/or the switch 3230 via the host bus interface. The host bus interface of the NIC 3240 may be implemented as one of the above-described examples of the interface 3254. The NIC 3240 may be incorporated with at least one of the processor 3210, the switch 3230, and the storage device 3250.

Processors 3210 through 3210m of the storage servers 3200 through 3200m or processors 3110 through 3110n of the application servers 3100 through 3100n may transmit commands to storage devices 3250 through 3250m or memories 3220 through 3220m of the storage servers 3200 through 3200m or storage devices 3150 through 3150n or memories 3120 through 3120n of the application servers 3100 through 3100n to program or read data. Here, the data may be error-corrected data provided by an ECC engine. The data may be obtained by data bus inversion (DBI) or data masking (DM) and may include cyclic redundancy code (CRC) information. The data may be encrypted data for security or privacy.

The storage devices 3150 through 3150n or 3250 through 3250m may transmit control signals and command/address signals to NAND flash memories 3252 through 3252m in response to read commands received from the processors 3110 through 3110n or 3210 through 3210m. Accordingly, in a case where data is being read out from the NAND flash memory devices 3252 through 3252m, read enable (RE) signals may be input as data output control signals to output data to a data bus DQ. Data strobe signals DQS may be generated using the RE signals. Commands and address signals may be latched to a page buffer in accordance with the rising edges or the falling edges of write enable (WE) signals.

The controller 3251 may control the general operation of the storage device 3250. The controller 3251 may include an SRAM. The controller 3251 may write data to the NAND flash memory 3252 in response to a write command or may read data from the NAND flash memory 3252 in response to a read command. For example, the write command and/or the read command may be provided by any one of the processors 3210 through 3210m of the storage servers 3200 through 3200m or any one of the processors 3110 through 3110n of the application servers 3100 through 3100n. A DRAM 3253 may temporarily store (or buffer) data to be written to, or read from, the NAND flash memory 3252. Also, the DRAM 3253 may store metadata. Here, the metadata may be user data or data generated by the controller 3251 for managing the NAND flash memory 3252. The storage device 3250 may include a secure element (SE) for security or privacy.

Embodiments have been described above with reference to the accompanying drawings, but the disclosure is not limited thereto and may be implemented in various different forms. It will be understood by those of ordinary skill in the technical field to which the disclosure belongs that the disclosure can be implemented in other specific forms without changing the technical spirit or gist. Therefore, it should be understood that the embodiments set forth herein are illustrative in all respects and not limiting.

What is claimed is:

1. A method of operating a computational storage device, comprising:
    setting, by a storage controller, a first computing namespace, which comprises a first queue and a first accelerator, and has a first identifier (ID) of the first computing namespace, in response to an instruction to set the first computing namespace being received from a first host device;
    setting, by the storage controller, a second computing namespace, which comprises a second queue and a second accelerator, and has a first ID of the second computing namespace, in response to an instruction to set the second computing namespace being received from a second host device;
    receiving, by the storage controller, a first program from the first host device and loading the first program in the first computing namespace;
    receiving, by the storage controller, a second program from the second host device and loading the second program in the second computing namespace;
    setting, by the storage controller, a second ID of the first computing namespace based on an ID of the first program in response to instruction to activate the first program being received from the first host device;
    setting, by the storage controller, a second ID of the second computing namespace based on an ID of the second program in response to instruction to activate the second program being received from the second host device; and
    instructing, by the storage controller, one of the first accelerator and the second accelerator to compute a first execute command based on the first ID of the first computing namespace, the first ID of the second computing namespace, the second ID of the first computing namespace, and the second ID of the second computing namespace having different value.

2. The method of claim 1, wherein the first ID of the first computing namespace and the first ID of the second computing namespace have different values based on the first accelerator and the second accelerator being different from each other, or
    wherein the first ID of the first computing namespace and the first ID of the second computing namespace have a same value based on the first accelerator and the second accelerator being the same.

3. The method of claim 1, wherein the second ID of the first computing namespace and the second ID of the second computing namespace have different values based on the ID of the first program and the ID of the second program being different from each other; and
    wherein the second ID of the first computing namespace and the second ID of the second computing namespace have a same value based on the ID of the first program and the ID of the second program being the same.

4. The method of claim 3, wherein each of the ID of the first program and the ID of the second program is one of a program unique ID (PUID) and a unique program ID (UPI).

5. The method of claim 1, wherein the first accelerator and the second accelerator are different from each other,
    wherein the first ID of the first computing namespace and the first ID of the second computing namespace are different from each other,
    wherein the ID of the first program and the ID of the second program are the same, and
    wherein the second ID of the first computing namespace and the second ID of the second computing namespace have a same value.

6. The method of claim 1, further comprising:
    setting, by the storage controller, a third computing namespace, which comprises a third queue and the second accelerator, and a first ID of the third computing namespace has a same value as the first ID of the second computing namespace, in response to an instruction to set the third computing namespace being received from a third host device.

7. The method of claim 1, wherein the instructing the one of the first accelerator and the second accelerator to compute a first execute command comprises:

receiving, by the storage controller, the first execute command from the first host device;

storing, by the storage controller, the first execute command in the first queue;

selecting, by the storage controller, one of the first accelerator and the second accelerator based on the first ID of the first computing namespace, the first ID of the second computing namespace, the second ID of the first computing namespace, and the second ID of the second computing namespace having different value; and computing, by the selected accelerator, stored data in accordance with the first execute command, using the first program.

8. The method of claim 1, wherein the selecting, by the storage controller, one of the first accelerator and the second accelerator comprises:

selecting, by the storage controller, the first accelerator in response to the first accelerator not being busy;

selecting, by the storage controller, the second accelerator in response to the first accelerator being busy, and the first ID of the first computing namespace and the first ID of the second computing namespace being the same; and selecting, by the storage controller, the second accelerator in response to the first accelerator being busy, the first ID of the first computing namespace and the first ID of the second computing namespace being different, and the second ID of the first computing namespace and the second ID of the second computing namespace being the same.

9. The method of claim 1, wherein the first execute command is an execute command in accordance with a Non-Volatile Memory express (NVMe) standard.

10. A method of operating a computational storage device, comprising:

receiving, by a storage controller, from a host device, an execute command giving an instruction to process a computation using a first computing namespace, wherein the first computing namespace comprises a first queue and a first accelerator, and a first program, and wherein the first accelerator has a first identifier (ID);

storing, by the storage controller, the execute command in the first queue;

selecting, by the storage controller, the first accelerator in response to the first accelerator not being busy;

identifying, by the storage controller, a second accelerator from among a plurality of accelerators, in response to the first accelerator being busy based on a first ID of the second accelerator having a same value as the first ID of the first accelerator;

selecting, by the storage controller, the second accelerator in response to the second accelerator not being busy;

selecting a third accelerator from among the plurality of accelerators, in response to the second accelerator being busy based on a second ID of the third accelerator having a same value as a second ID of the first accelerator and based on a first ID of the third accelerator having a different value than the second ID of the third accelerator; and computing, by whichever of the first accelerator, the second accelerator, and the third accelerator is selected, data in accordance with the execute command, using the first program.

11. The method of claim 10, wherein the second accelerator is mapped to the first queue.

12. The method of claim 10, wherein the first program is activated in a computing namespace comprising the third accelerator.

13. The method of claim 10, wherein the data is stored in a nonvolatile memory of the computational storage device.

14. The method of claim 10, wherein the execute command is an execute command in accordance with the Non-Volatile Memory express (NVMe) standard.

15. A computational storage device comprising:

a nonvolatile memory storing data;

a storage controller configured to control the nonvolatile memory; and a plurality of accelerators configured to compute the data in accordance with an execute command received from a host device, using a program received from the host device, wherein the storage controller is configured to:

map respective first identifiers (IDs) to respective accelerators from the plurality of accelerators in response to an instruction to set a computing namespace received from the host device;

map respective second IDs to the respective accelerators from the plurality of accelerators in response to an instruction to activate a program received from the host device, wherein each accelerator among the plurality of accelerators has a first ID and a second ID;

receive, from the host device, a first execute command to be processed using a first accelerator having a first ID;

select at least one of the plurality of accelerators to process a computation in accordance with the first execute command, based on the respective first IDs and the respective second IDs; and instructing, the at least one selected accelerator, to compute stored data in accordance with the first execute command, using the program received from the host device.

16. The computational storage device of claim 15, wherein after the receipt of the instruction to activate the program from the host device, the storage controller is configured to map the respective second IDs to the respective accelerators from the plurality of accelerators based on an ID of the activated program.

17. The computational storage device of claim 16, wherein the ID of the activated program is one of a program unique ID (PUID) and a unique program ID (UPI).

18. The computational storage device of claim 15, wherein based on the first accelerator being busy, the storage controller is configured to select a second accelerator, wherein a first ID of the second accelerator has a same value as that of the first ID of the first accelerator.

19. The computational storage device of claim 18, wherein based on the first accelerator and the second accelerator being busy, the storage controller is configured to select a third accelerator from the plurality of accelerators, wherein a second ID of the third accelerator has a same value as a second ID of the first accelerator.

20. The computational storage device of claim 15, wherein the computing namespace comprises at least one queue, which is configured to store the execute command received from the host device, and at least one accelerator, which is configured to process a computation in accordance with the execute command received from the host device.

* * * * *